June 6, 1939.   C. J. MALM ET AL   2,161,364
ANTIHALATION COATING
Filed Sept. 17, 1938

Carl J. Malm
John Emerson
INVENTORS

BY
ATTORNEYS

Patented June 6, 1939

2,161,364

UNITED STATES PATENT OFFICE 2,161,364

ANTIHALATION COATING

Carl J. Malm and John Emerson, Rochester, N. Y., assignors to Eastman Kodak Company, Rochester, N. Y., a corporation of New Jersey Application September 17, 1938, Serial No. 230,504

10 Claims. (Cl. 95—9)

This invention relates to photographic film and particularly to coatings to be applied thereto for various purposes, such as for preventing halation.

One of the objects of the present invention is to provide a novel anti-halation backing or protective coating for photographic film. A further object is to provide an anti-halation backing or protective coating which is readily soluble in alkaline solutions, such as photographic developers. Other objects will appear from the following description of our invention.

Figure 1:
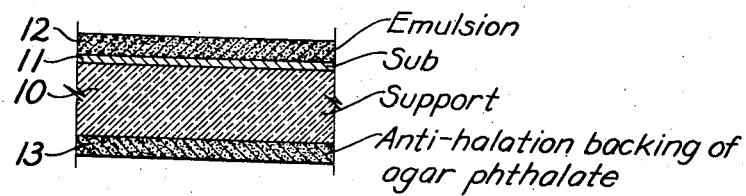
Figure 2:
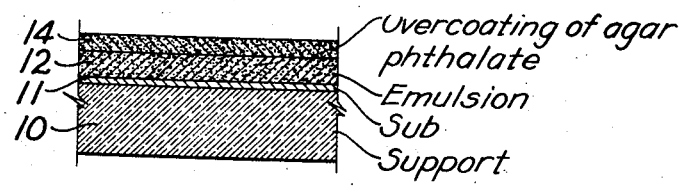
Figure 3:
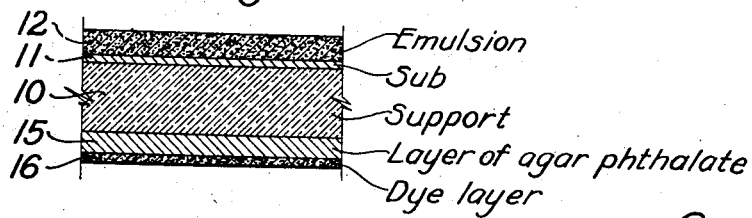

In the accompanying drawing Fig. 1 is an enlarged sectional view of a photographic film having an anti-halation backing made according to our invention, Fig. 2 is an enlarged sectional view of a photographic film having an overcoating layer made according to our invention, and Fig. 3 is an enlarged sectional view of a film having separate backing layers of alkali soluble material and dye.

We have found that dicarboxylic acid esters of agar, such as agar phthalate and agar succinate are suitable for use as overcoating and backing layers for photographic film, and that they may contain an anti-halation or filter dye, or may be coated on the film and overcoated with a dye solution. These materials are coated in solution as the free acid ester and upon treatment of the film in alkaline solution, such as photographic developing solutions, an alkali metal salt of the phthalate is formed and this compound dissolves freely in the solution. The agar phthalate or agar succinate itself is not soluble in water but must be coated from a suitable solvent solution.

The dicarboxylic acid esters of agar are prepared by treating agar with a dicarboxylic acid anhydride in the presence of a tertiary organic base, such as pyridine. The agar is first swollen by soaking it in water or dilute acid and then removing the aqueous liquid therefrom and treating the swollen agar with a mixture of dicarboxylic acid anhydride and the tertiary organic base at an elevated temperature. A method for preparing these compounds is described in our copending application, Serial No. 230,505, filed Sept. 17, 1938.

The preferred form of our invention is agar phthalate which is insoluble in water but which forms an alkali metal salt when the film on which it is coated is immersed in the photographic developing solution. This salt dissolves freely in the developing solution, although it is more easily removed by slight abrasion, such as by rubbing with a wad of cotton.

An agar phthalate is soluble in various organic solvents, among which are acetone-alcohol mixtures, β-methoxy ethyl alcohol, ethoxy ethyl acetate, 95% acetone or methyl ethyl ketone in water, 50–50% solutions of benzene and methanol or toluene and methanol, and an 80–20% of ethylene chloride and methyl alcohol.

Our invention will now be described with reference to the accompanying drawing. As shown therein, Fig. 1 is a sectional view of a film support 10 of glass, cellulose nitrate, cellulose acetate, synthetic resin or other suitable material having thereon the usual gelatin sub-layer 11 and emulsion layer 12. The opposite side of the support is coated with a layer 13 of agar phthalate containing an anti-halation dye.

Fig. 2 shows a film in which the support 10 is coated with sub-layer 11 and emulsion layer 12 and is overcoated with a layer 14 of agar phthalate containing a filter dye. If the overcoating layer is used for protection against static or abrasion, the dye may be omitted from the agar phthalate. A protective layer of agar phthalate with or without a dye may also be applied to the reverse side of the film or plate.

Fig. 3 shows another modification in which the support 10 having sub-layer 11 and emulsion layer 12 on one side thereof is coated on the opposite side with a layer of agar phthalate 15 not containing a dye and a layer 16 of dye coated from a solution of water or an organic solvent is laid over the agar phthalate layer 15.

Our invention will be more specifically described by means of the following examples which are illustrative only.

Example I

A 3% solution of agar phthalate is made up in a 50-50 acetone-methyl alcohol mixture. This solution is applied to the back of a cellulose acetate film support at a speed of approximately five feet per minute. The agar phthalate coating is dried and is then tinted with a 1% solution of Spirit Nigrosine (Color Index No. 864) in methyl alcohol. The dye solution may also contain a spreading agent, such as Aerosol AY (sold by American Cyanamide and Chemicals Corp.) in an amount of about 1% of the volume of the dye solution. If desired, a lubricant, such as carnauba wax may also be added to the dye solution and in this case a solvent must be used which dissolves both the carnauba wax and the dye, such as carbon tetrachloride. The wax is used in the amount of about 1 gram per liter of dye solution.

*Example II*

A 5% solution of agar phthalate is prepared in a 95% acetone solution and is applied to the back of a cellulose acetate propionate film support at a coating speed of five feet per minute. After drying, this layer is coated with a .2% solution of Acid Blue 2—R (Color Index No. 707) in water.

*Example III*

A 3% solution of agar phthalate is prepared in a 50-50% acetone methyl alcohol mixture. To this solution is added about 1% of Spirit Nigrosine and the mixture is coated on cellulosic film support, at a coating speed of five feet per minute.

In every case the amount of dye is adjusted to give the desired density in the final coating. For anti-halation effects the density should be approximately 0.2, expressed as a logarithm to the base 10, whereas, if greater protection is desired, as in the case of overcoating layers for cinematographic film leader the density may be as great as 1.

It is apparent from the above invention that our anti-halation layers may consist of one, two or more separate coatings or layers and that the dyes may be contained in one or more of the layers. By the term "anti-halation layer" it is understood that we include any of these combinations whether one or more actual layers are contained in the coating.

Coatings of dicarboxylic acid esters of agar have a number of favorable characteristics. In addition to forming a suitable carrier or supporting layer for an anti-halation or filter dye, which is readily removed in photographic developers, they are resistant to moisture. An overcoating layer of a dicarboxylic acid ester of agar, therefore, protects the film or the emulsion from the action of moisture and also may serve as a protective coating to avoid scratches and abrasion marks on films or plates. Numerous variations may be made in the coating solutions, solvents, dyes and other features of our invention and it is to be understood that the invention is to be taken only by the scope of the appended claims.

What we claim is:

1. A transparent photographic element comprising a superficial coating of a dicarboxylic acid ester of agar.

2. A transparent photographic element comprising a superficial coating of agar phthalate.

3. A transparent photographic element comprising a superficial coating of agar succinate.

4. A sensitive photographic element comprising a support, a sensitive emulsion layer thereon, and a layer of a dicarboxylic acid ester of agar thereon.

5. A sensitive photographic element comprising a support, a sensitive emulsion layer on one side thereof, and an anti-halation layer containing a dicarboxylic acid ester of agar on the opposite side thereof.

6. A sensitive photographic element comprising a support, a sensitive emulsion layer on one side thereof, and an anti-halation layer of agar phthalate on the opposite side thereof.

7. A sensitive photographic element comprising a cellulosic support, an emulsion layer on one side of said support, and an anti-halation layer of a dicarboxylic acid ester of agar and a dye on the opposite side thereof.

8. A sensitive photographic element comprising a cellulosic support, an emulsion layer on one side of said support, and an anti-halation layer of a dicarboxylic acid ester of agar phthalate.

9. A sensitive photographic element comprising a support, a sensitive emulsion layer on said support and a protective coating of a dicarboxylic acid ester of agar over the emulsion layer.

10. The method of providing a photographic element with an anti-halation coating which comprises dissolving agar phthalate in a non-aqueous solvent, coating the solution on the rear face of the element and coating an anti-halation dye over the agar phthalate layer.

CARL J. MALM.
JOHN EMERSON.